(12) United States Patent
Sawade

(10) Patent No.: US 11,263,917 B2
(45) Date of Patent: Mar. 1, 2022

(54) MOTION SIMULATOR WITH OCCUPANT LOADING

(71) Applicant: McLaren Applied Technologies Limited, Woking (GB)

(72) Inventor: Caleb Allan Sawade, Melbourne (AU)

(73) Assignee: McClaren Applied Limited, Woking (GB)

( * ) Notice: Subject to any disclaimer, the term of this patent is extended or adjusted under 35 U.S.C. 154(b) by 366 days.

(21) Appl. No.: 16/335,631

(22) PCT Filed: Sep. 21, 2017

(86) PCT No.: PCT/GB2017/052831
§ 371 (c)(1),
(2) Date: Mar. 21, 2019

(87) PCT Pub. No.: WO2018/055387
PCT Pub. Date: Mar. 29, 2018

(65) Prior Publication Data
US 2019/0311645 A1  Oct. 10, 2019

(30) Foreign Application Priority Data
Sep. 21, 2016 (GB) .................................... 1616061

(51) Int. Cl.
*G09B 9/058* (2006.01)
*G09B 9/05* (2006.01)
(Continued)

(52) U.S. Cl.
CPC ............... *G09B 9/058* (2013.01); *G09B 9/02* (2013.01); *G09B 9/05* (2013.01); *G09B 19/167* (2013.01); *G09B 9/066* (2013.01)

(58) Field of Classification Search
CPC . G09B 9/058; G09B 9/02; G09B 9/05; G09B 19/167; G09B 9/066
(Continued)

(56) References Cited

U.S. PATENT DOCUMENTS

| 2003/0059744 A1* | 3/2003 | Tuluie ................... G09B 9/058 434/61 |
| 2015/0279228 A1* | 10/2015 | Dericquebourg ...... G09B 9/042 434/61 |

FOREIGN PATENT DOCUMENTS

| EP | 3491632 B1 | 2/2021 |
| GB | 2378687 A | 2/2003 |

(Continued)

OTHER PUBLICATIONS

International Search Report for Appln. No. PCT/GB2016/052831 dated Feb. 1, 2018, 2 pages.
(Continued)

*Primary Examiner* — Robert P Bullington
(74) *Attorney, Agent, or Firm* — Dergosits & Noah LLP

(57) ABSTRACT

A motion simulator for imposing loads on an occupant, the simulator having: a movable carrier for supporting the occupant; a first drive mechanism for moving the carrier; multiple loading elements configured for attachment to the occupant when the occupant is supported by the carrier; a second drive mechanism for actuating the loading elements to apply loads to the occupant; and a controller, the controller being configured to implement a simulation of a motion event by: (i) estimating a motion of the carrier consistent with the motion event and controlling the first drive mechanism to cause the carrier to adopt the estimated motion; (ii) estimating a first load on the occupant consistent with the motion event; (iii) estimating a second load on the occupant due to the motion adopted by the carrier and (iv) controlling the second drive mechanism to cause the second
(Continued)

drive mechanism to apply to the occupant a load that is the difference between the first estimated load and the second estimated load.

20 Claims, 3 Drawing Sheets

(51) Int. Cl.
*G09B 19/16* (2006.01)
*G09B 9/02* (2006.01)
*G09B 9/06* (2006.01)

(58) Field of Classification Search
USPC .......................................................... 434/61
See application file for complete search history.

(56) References Cited

FOREIGN PATENT DOCUMENTS

| GB | 2427179 A | 12/2006 |
|----|-----------|---------|
| GB | 2509053 A | 6/2014 |
| SU | 963068 A1 | 9/1982 |

OTHER PUBLICATIONS

Patents Act 1977: Search Report under Section 17(5) for Application No. GB161606.6 dated Jan. 31, 2017, 4 pages.
Patents Act 1977: Examination Report under Section 18(3) for Application No. GB1616061.6, dated Dec. 16, 2021, 3 pages.

* cited by examiner

MOTION SIMULATOR WITH OCCUPANT LOADING

CROSS-REFERENCE TO RELATED APPLICATIONS

The present Application claims the benefit of International Application No. PCT/GB2017/052831, entitled "MOTION SIMULATOR WITH OCCUPANT LOADING," filed Sep. 21, 2017, which claims the benefit of Great Britain Patent Application No. 1616061.6, entitled "MOTION SIMULATOR WITH OCCUPANT LOADING" filed on Sep. 21, 2016. The contents of International Application No. PCT/GB2017/052831 and Great Britain Patent Application No. 1616061.6 are hereby incorporated by reference.

FIELD OF DISCLOSURE

This invention relates to a motion simulator, for example for simulating the motion of a vehicle or animal. The simulator has means for loading the occupant, for example to provide a more realistic motion sensation.

BACKGROUND OF THE INVENTION

Motion simulators for simulating the motion of an aircraft or automobile typically have a platform in which an occupant sits. The platform is moved by a motion system—for example a Stewart platform or hexapod—in such a way as to give the occupant a sensation of being in a real vehicle. One area in which the simulation does not normally match the real world is that free parts of the occupant's body are not loaded independently of the motion of the platform. For most applications this is not significant because the user's body is largely anchored to the platform (e.g. by being in a close-fitting seat) or because the simulation is not one that involves high body loads. Some simulators can load the user's body by means of inflatable pockets contained in a suit worn by the occupant, but the frequency response of these systems can be limited relatively low frequencies.

An application in which the user's body is not largely anchored to the platform is in simulating the motion of a motorcycle. U.S. Pat. No. 6,733,294 discloses a motorcycle testing rig in which cords are attached between a static frame and the limbs of a dummy located on a motorcycle. The cords are pulled in order to apply loads to the dummy.

An application in which high body loads are significant is in simulating the motion of a racing car. GB 2 427 179 discloses a mechanism for loading the helmet of an occupant to improve the fidelity of a racing car simulator.

There is a need for an improved design of simulator, especially but not exclusively for applications in which it is advantageous to provide body loading in addition to platform loading.

SUMMARY OF THE INVENTION

According to a first aspect of the present invention there is provided a motion simulator for imposing loads on an occupant, the simulator having: a movable carrier for supporting the occupant; a first drive mechanism for moving the carrier; multiple loading elements configured for attachment to the occupant when the occupant is supported by the carrier; a second drive mechanism for actuating the loading elements to apply loads to the occupant; and a controller, the controller being configured to implement a simulation of a motion event by: (i) estimating a motion of the carrier consistent with the motion event and controlling the first drive mechanism to cause the carrier to adopt the estimated motion; (ii) estimating a first load on the occupant consistent with the motion event; (iii) estimating a second load on the occupant due to the motion adopted by the carrier and (iv) controlling the second drive mechanism to cause the second drive mechanism to apply to the occupant a load that is the difference between the first estimated load and the second estimated load.

According to a second aspect there is provided a motion simulator for imposing loads on an occupant, the simulator having: a movable carrier for supporting the occupant; a first drive mechanism for moving the carrier; multiple loading elements configured for attachment to the occupant when the occupant is supported by the carrier; a second drive mechanism for actuating the loading elements to apply loads to the occupant; and a controller, the controller being configured to implement a simulation of a motion event by controlling the second drive mechanism to cause the second drive mechanism to apply a load to the occupant; wherein the second drive mechanism comprises a plurality of actuators for actuating the loading elements, the actuators being located so as to apply loads to the occupant from locations that are non-coplanar.

The loading elements may be flexible members or rigid members.

The second drive mechanism may comprise a plurality of linear actuators or rotary actuators or a combination thereof, each coupled to one or more of the loading elements.

The loading elements may be attached to an article of clothing for applying loads to the occupant.

The load on the occupant may be a load on a part of the occupant's body. That part may be a limb or a part thereof, a torso or a head. The said step (iv) may comprise controlling the second drive mechanism to cause the second drive mechanism to apply to the occupant a load that is the difference between the first estimated load and the second estimated load by actuating a loading element that bears on that part of the occupant's body.

The loading elements may be coupled to multiple mutually articulated parts of the occupant's body. The controller may be configured to implement a simulation of the motion event by: for each of those parts of the occupant's body estimating a respective second load on that part of the occupant's body due to the motion adopted by the carrier and controlling the second drive mechanism to cause the second drive mechanism to apply to that part of the occupant's body a load that is the difference between the first estimated load and the second estimated load.

The second drive mechanism may be carried by the carrier.

The second drive mechanism may comprise a plurality of actuators for actuating the loading elements. The actuators may be located so as to apply loads to the occupant from locations that are non-coplanar.

The movable carrier may comprise a cockpit defining an occupant position. One or more of the actuators may be located so as to apply loads to the occupant from the rear of the occupant position. One or more of the actuators may be located to apply loads to the occupant from in front of the occupant position. The senses of rear and front may be defined by respect to a natural orientation of the occupant in the occupant position.

The occupant position may include a seat. A region of the cockpit forward of the seat may comprise a housing. The housing may fully or partially surround the occupant position, or it may be located adjacent the occupant position, e.g.

immediately below the occupant position. The housing may be configured to resemble a part of a vehicle, an animal (e.g. a horse), or another means of transport (e.g. a snowboard, skis, a skateboard or a surfboard). One or more of the actuators of the second drive mechanism may be located within the housing. The vehicle may be a motorcycle and the part of a vehicle may be a fuel tank. The vehicle may be a bicycle and the part of the vehicle may be a frame (e.g. a top tube) or fork.

The simulator may be a motorcycle simulator. The simulator may comprise a cockpit defining an occupant position including a seat. The simulator may comprise a pair of plates extending laterally below the level of the seat and configured for contacting the knees of an occupant seated on the seat.

The simulator may comprise a third drive mechanism for driving the inclination of the plates relative to the seat to vary.

The present invention will now be described by way of example with reference to the accompanying drawings.

DETAILED DESCRIPTION OF THE INVENTION

Figure 1:
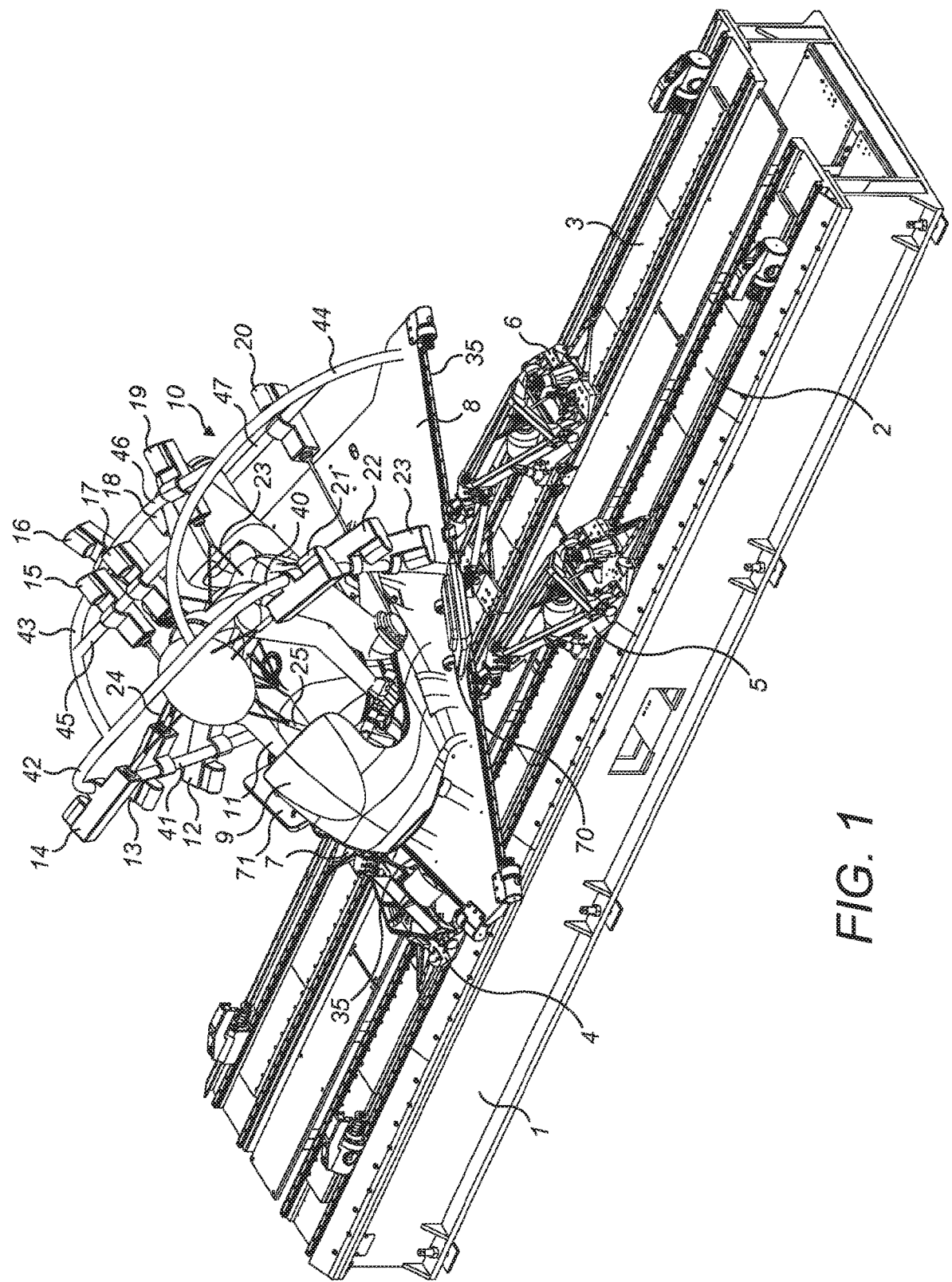
FIG. 1 is an isometric view of a simulator from above and in front

FIG. 1 shows a motion simulator for simulating the motion of a motorcycle. The simulator comprises a static base 1. The static base is fixed rigidly to the floor of a room where the simulator is being used. The base carries a system of rails 2, 3 and carriages 4, 5, 6, 7. Together they support and impart motion to a platform 8. On the platform is a cockpit or chassis 9, which in this example mimics a motorcycle, and a frame 10. The frame 10 is positioned to wrap around an occupant 11 of the simulator. A series of cord pullers 12-23 are attached to the frame. Cords 24 extend from the cord pullers to points on the occupant. The cord pullers are capable of applying tension to the cords so as to apply loads to the occupant. As will be described in more detail below, further cords 25 extend from the occupant to cord pullers located inside the cockpit. Those cord pullers are not visible in FIG. 1.

The chassis supports the occupant. The chassis may be provided with a seat, a saddle, foot bindings, pedals, stirrups or another form of support for the occupant. The chassis may be configured to resemble the appearance of an object being simulated.

Figure 3:
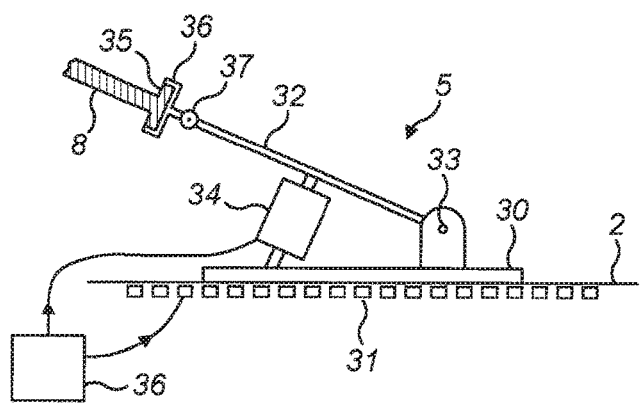
FIG. 3 illustrates the mechanism of a carriage of the simulator of FIG. 1.

The arrangement of carriages and rails serves to move the platform 8 in six degrees of freedom relative to the base. Carriages 4 and 5 are constrained to slide linearly on rail 2. Carriages 6 and 7 are constrained to slide linearly on rail 3. The rails are equipped with linear motors for urging the carriages to move along them. FIG. 3 shows carriage 5 in detail. The other carriages are similar. The carriage comprises a sled 30 which is movable on the linear motor 31 of rail 2. An arm 32 is mounted on the sled so it can pivot about an axis 33 transverse to the rail 3. A linear actuator 34 acts between the sled 30 and the arm 32 for raising or lowering the arm relative to the sled. Side rails 35 run along the lateral edges of the platform 8. Each side rail is linear. The side rails converge towards the front of the cockpit 9. On the upper end of the arm 32 is a cup 36 which mates with the side rail 35. The cup can slide along the rail. The cup 36 is mounted to the arm by a universal joint 37. Of the two carriages on each rail, one is attached to each of the side rails 35. The operation of the linear motors for moving all the carriages, and the operation of all the linear actuators, is controlled by a control unit 38. This mechanism can impart motion to the platform in six degrees of freedom in an analogous way to that described in GB 2 378 687. Other mechanisms could be provided for moving the platform with six degrees of freedom, for example a Stewart platform or a system as disclosed in WO 2016/110719. In some applications it may be satisfactory for the platform to be capable of moving with fewer than six degrees of freedom relative to the base.

The frame 10 is rigid with respect to the platform 8. The frame comprises a forward hoop composed of two side members 40, 41 joined together above the occupant 11 by an upper cross member 42. The side members are located on either side of the occupant position, or of an occupant when in the occupant position. The side members are located such that when the occupant is in the natural position in or on the cockpit the occupant's torso is located directly between the side members. This means that cord pullers 12-14 and 21-23 which are mounted on the side members can apply substantially opposed and/or substantially lateral forces to the occupant's body. The frame further comprises two rear supports 43, 44. The rear supports extend from the cross member 42 to the platform 8. A series of rear cross members 45 to 47 extend between the rear supports. The rear cross members are located such that when the occupant is in the natural position in or on the cockpit the occupant's back is facing the rear cross members. This means that cord pullers 15-20 which are mounted on the cross members can apply substantially rearward forces to the occupant's body. The frame could be arranged in any suitable way, depending on the directions in which it is desired to exert forces on the occupant. It is convenient if the pullers are arranged so that the locations from which they exert loads on the occupant are non-coplanar. Then the pullers can simulate loads from a variety of angles around the body: for example two or more of accelerative loads, decelerative loads, rightward lateral loads and leftward lateral loads. There may be an absence of pullers above and below the occupant position. A reason for this may be that in some applications, for example simulating road vehicles, vertical loads on the occupant's body independent of the platform loads are of minor significance.

Figure 2:
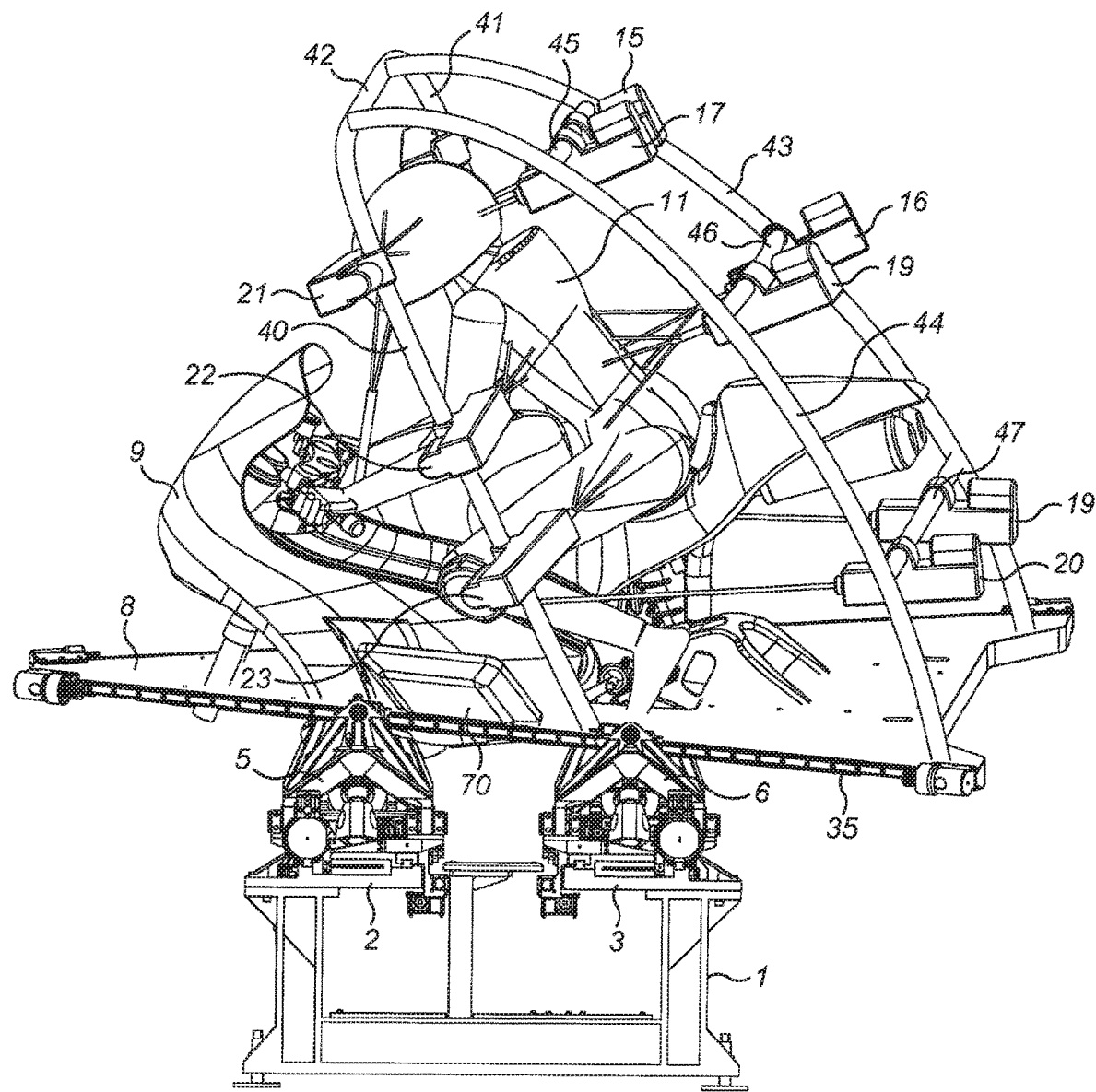
FIG. 2 is a side view of the simulator of FIG. 1.

In the example shown in FIGS. 1 and 2 the cockpit simulates a motorcycle. There is a simulated fuel tank in front of the occupant's position. To apply forward forces to the occupant further cord pullers are located in the simulated tank. Cords extend from the further cord pullers to the occupant.

Figure 4:
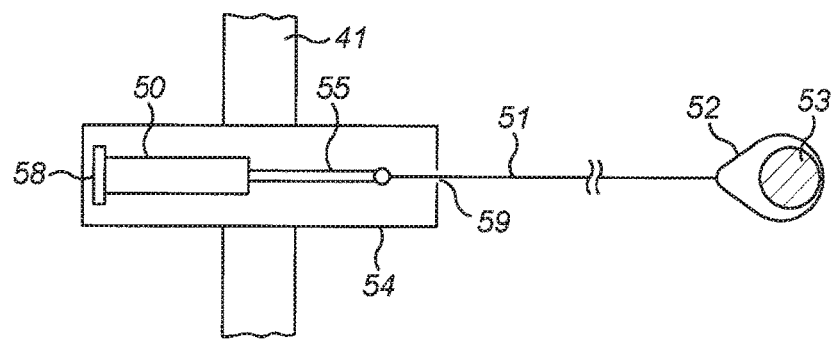
FIG. 4 illustrates a linear actuator for pulling a cord.

FIG. 4 shows an example of a cord puller in more detail. The cord puller is attached to side member 41. The cord puller comprises a casing 54. Inside the casing is a linear actuator whose body 50 is fixed to the casing. The mobile part 55 of the actuator is attached to a cord 51. Cord 51 extends out of the housing 54. The other end of the cord is attached to the occupant. In this example it is attached to an item of clothing 52 which wraps around an arm 53 of the occupant. This arrangement allows the linear actuator to exert a force on the arm of the occupant. The body 50 of the linear actuator is fixed to the casing by a strain gauge 58 which allows the force applied to the occupant to be measured. The output of this sensor is used as an input to the control process, for example to provide feedback as to whether the currently applied load meets a target applied load.

Figure 5:
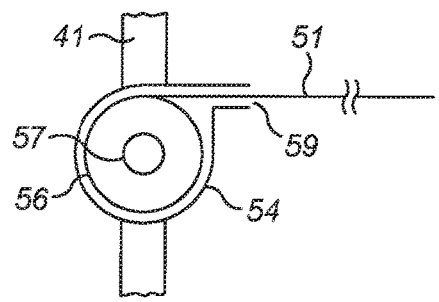
FIG. 5 illustrates a rotary actuator for pulling a cord.

FIG. 5 shows an alternative design of cord puller. In FIG. 5 like parts are designated by the same reference numerals as in FIG. 4. In the cord puller of FIG. 5 the cord 51 is wound on a spool 56. The spool can be driven to rotate by a motor 57 so as to withdraw cord into the spool or pay it out.

The cord could be flexible. The cord could be braided, wound or monofilament material. The cord could, for example, be made of metal or plastics material. Instead of flexible cord, the members interconnecting the pullers and the occupant could be rigid rods.

The cord pullers of FIGS. 4 and 5 exert forces from a point at which the cord runs in a straight line to the occupant's body when in tension. That point may, for example, be defined by the orifice 59 where the cord passes through the housing 54 of, if that orifice is large enough to permit substantial motion of the cord relative to the housing, the point where the cord leaves the linear actuator or spool. The point from which the force is exerted will depend on the implementation of the cord pullers and may vary depending on the direction in which the cord is extending at the time under consideration.

The cords may be adapted to attached to an occupant. For example, one or more of the cords may be attached to an article of clothing such as an overall, footwear, gloves or a helmet. Alternatively, one or more of the cords could terminate in loops that can pass around a limb or other body part of a user. Alternatively, one or more of the cords could terminate in fixings such as clips or loops that can be attached to corresponding fixings on one or more articles of clothing such as an overall, footwear, gloves or a helmet. Clothing to which the cords are attached could include sections of differing stiffness (such as foam or plastic layers) to evenly distribute the force to the body and maintain higher stiffness between actuator and occupant.

In the example of a motorcycle simulator, the cockpit has side pads 70, 71 to simulate the presence of a road under the occupant's knee. The side pads extend to the side of the cockpit. The side pads are located so that the occupant's knee can contact them if it is swung outwards from the normal occupancy position. The side pads may be capable of being driven to change their attitude with respect to the remainder of the cockpit so that they can simulate a road at an appropriate angle of lean. The side pads may be driven by motors mounted on the chassis. The motion of the side pads relative to the remainder of the chassis may be driven under the control of the controller 36.

The occupant can provide inputs to influence the operation of the simulator. In the example of a motorcycle simulator those could include: a steering input provided by turning handlebars of the cockpit, a braking input provided by pulling a brake lever of the cockpit and an acceleration input provided by twisting a throttle grip of the cockpit. If the cockpit were simulating another vehicle or mode of transport then the inputs could be different.

Figure 6:
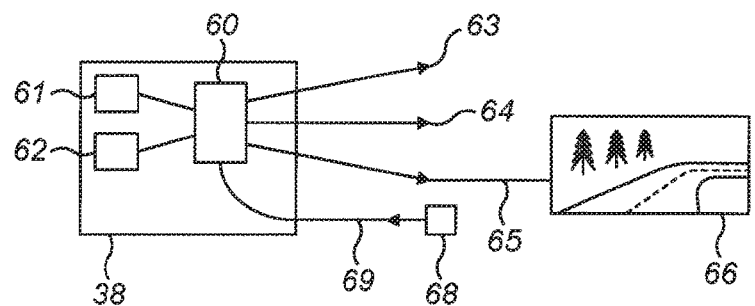
FIG. 6 shows schematically a control system for a simulator.

FIG. 6 illustrates the control system for the simulator. The control unit 38 comprises a processor 60. The processor 60 is arranged to execute program code stored in a non-transient way in memory 61. The program code is configured for causing the control unit to perform each of its functions. The control unit also stores environment data in a memory 62. The environment behaviour describes an environment to be simulated and provides a definition of how the simulator will respond to inputs from the operator. The control unit has an output 63 for controlling the motion of the carriages and an output 64 for controlling the motion of the cord pullers. These are operated in accordance with the environment data in order to provide desired simulation behaviour. A further output 65 controls a display 66. The display 66 displays information defined by the environment data in accordance with a supposed location and attitude of the simulated object. The display could be rigid with the base 1. It could wrap around the cockpit. Alternatively the display could be carried by the platform. The display could be integrated with a helmet worn by the occupant. Sensors 68 sense the position of the platform, the state of the cord pullers and control inputs of the occupant: for example steering or braking. These provide inputs via line 69 to influence the operation of the processor 60.

To simulate the motion of a vehicle or other moving system the program code is arranged so that the motions applied to the occupant through the movement of the platform 8, the loads applied to the occupant through the cords 25 and the visual information displayed on display 66 are synchronised and match a desired set of performance characteristics for the moving system. For example, the environment data may store information defining a corner on a racetrack. As a motorcycle in the simulated environment approaches the corner the occupant of the simulator can provide a steering input using the handlebars of the cockpit. The steering input will be sensed and the processor will determine a reaction of the motorcycle in the simulated environment to the steering input in accordance with environment data defining the performance of the motorcycle under simulation. The platform and the cord pullers can then be controlled to provide the occupant with an impression of that reaction. Thus, in dependence on (a) predefined information regarding the environment being simulated, including the layout of that environment and the performance of the simulated object to operator inputs and (b) operator inputs received from the occupant, the processor determines a reaction of the simulated object and controls the motion of the platform, the operation of the cord pullers and the attitude of the road plates 70, 71 to simulate that reaction. The reaction may involve (a) accelerations of the body of the object being simulated (e.g. accelerations of a motorcycle chassis) and (b) loads experienced by the body of the occupant. Accelerations of the body of the object being simulated can be expressed by applying corresponding accelerations to the chassis 9. The actual accelerations applied to the chassis may be the same as those calculated as the reaction or different, for example if the platform is approaching the limit of its travel. The loads experienced by the body of the occupant are simulated by means of the cord pullers. However, when accelerations are also being applied to the user's body through the chassis, the actual loads applied to the user's body need not be the same as those calculated because the user's body will also be experiencing loads as a result of the motion of the chassis. To determine the loads to be applied to the user's body the processor 60 is configured by means of the code stored in memory 61 to perform the following steps:

1. Estimate based on the environment data and control inputs received from the occupant a resulting motion of the object under simulation and resulting loads on the occupant.
2. Determine a set of motions to be commanded of the carriages for moving the motion platform to simulate the resulting motion of the object under simulation.
3. Estimate the loads on the occupant resulting from the set of motions determined in step 2.

4. Subtract the loads estimated in step 3 from the loads estimated in step 1 to form a set of net loads.

5. Determine a set of actions to be commanded of the cord pullers for moving the cords to simulate the net loads determined in step 4.

6. Command the carriages and the cord pullers to apply the motions and loads determined in steps 2 and 5. In this way the loads applied to the occupant can be compensated for the loads applied through the motion of the platform.

In the examples described above the occupant is coupled to the pullers by flexible members. The flexible members could, for example, be formed of polymer line, rope or of metallic cables. The flexible members could be elastic. Where a flexible member is to be urged to move, that could be done by a reel or a linear actuator. Instead of flexible members the occupant could be coupled to the pullers by rigid members. The rigid members could be rigid rods. The rigid rods could be urged to move by a linear actuator or they could be connected off-centre to an arm that can be driven to rotate. Using rigid rods as the members connecting the user to the actuators permits parts of the user's body to be both pushed and pulled by the same connecting member, which may reduce the number of connecting members and actuators needed. Rigid connecting members may be coupled to their actuators and to the user's body by flexible couplings.

The loads applied to the occupant can be estimated for the occupant's body as a whole, or more preferably for individual segments of the occupant's body. Those segments may correspond to the zones at which the cords are attached. For example, in the system illustrated in the figures the loads may be calculated for the following segments:

the occupant's head, the cords from pullers 14, 15, 17, 21 and one of the pullers in the cockpit being attached to the occupant's head by way of a helmet; and the occupant's upper torso, the cords from pullers 13, 16, 19 22 and one of the pullers in the chassis being attached to the occupant's upper torso by way of the occupant's clothing.

Loads may be calculated for other body segments, for example the occupant's elbows or knees. The loads may be calculated from a pre-stored mass for the body segment in question, which can be stored in the environment data, and the acceleration simulated to be undergone by the body segment in question which is determined as described above. The pre-stored masses may be standard for all occupants or estimated from the body weight and/or physique of a specific occupant.

The segments for which loads are calculated are conveniently mutually articulated segments of the occupant's body. The segments for which loads are calculated are conveniently parts of the occupant's body that, when the occupant is in position on the cockpit is not fixed in place relative to the cockpit.

FIGS. 1 and 2 show a motorcycle simulator. The cockpit resembles a motorbike and provides the occupant with the seating position of a motorbike. The principles of the simulator described above could be used to simulate other objects, especially means of transport. Examples include but are not limited to bicycle simulators, horse riding simulators, skiing simulators (in which the cockpit could take the form of skis which are movable mounted on the platform), surfing simulators or skateboarding simulators.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A motion simulator for imposing loads on an occupant, the motion simulator having:
   a movable carrier configured to support the occupant;
   a first drive mechanism configured to move the movable carrier;
   multiple loading elements configured to attach to the occupant when the occupant is supported by the movable carrier;
   a second drive mechanism configured to actuate the multiple loading elements to apply loads to the occupant; and
   a controller, the controller being configured to implement a simulation of a motion event by: (i) estimating an estimated motion of the movable carrier consistent with the motion event and controlling the first drive mechanism to cause the movable carrier to adopt the estimated motion; (ii) estimating a first estimated load on the occupant consistent with the motion event; (iii) estimating a second estimated load on the occupant due to the motion adopted by the movable carrier and (iv) controlling the second drive mechanism to cause the second drive mechanism to apply to the occupant a differential load that is a difference between the first estimated load and the second estimated load.

2. The motion simulator as claimed in claim 1, wherein the multiple loading elements are flexible cords.

3. The motion simulator as claimed in claim 1, wherein the second drive mechanism comprises a plurality of linear actuators each coupled to one or more of the multiple loading elements.

4. The motion simulator as claimed in claim 1, wherein the second drive mechanism comprises a plurality of rotary actuators each coupled to one or more of the multiple loading elements.

5. The motion simulator as claimed in claim 1, wherein the multiple loading elements are configured to attach to an article of clothing for applying loads to the occupant.

6. The motion simulator as claimed in claim 1, wherein the differential load is on a part of the occupant and the step (iv) comprises controlling the second drive mechanism to cause the second drive mechanism to apply to the occupant the differential load that is the difference between the first estimated load and the second estimated load by actuating a loading element that bears on the part of the occupant.

7. The motion simulator as claimed in claim 1, wherein:
   the multiple loading elements are coupled to multiple mutually articulated parts of the occupant;
   (iii) estimating a second estimated load on the occupant due to the motion adopted by the movable carrier includes, for each mutually articulated part, estimating a respective second estimated load on the mutually articulated part due to the motion adopted by the movable carrier; and
   (iv) controlling the second drive mechanism to cause the second drive mechanism to apply to the occupant a differential load that is a difference between the first estimated load and the second estimated load includes, for each mutually articulated part, controlling the second drive mechanism to cause the second drive mechanism to apply to the mutually articulated part a differential load that is a difference between the first estimated load and the respective second estimated load.

8. The motion simulator as claimed in claim 1, wherein the second drive mechanism is carried by the movable carrier.

9. The motion simulator as claimed in claim 1, wherein the second drive mechanism comprises a plurality of actuators configured to actuate the multiple loading elements, the plurality of actuators being located so as to apply loads to the occupant from locations that are non-coplanar.

10. The motion simulator as claimed in claim 9, wherein the movable carrier comprises a cockpit defining an occupant position, at least one of the plurality of actuators is located so as to apply loads to the occupant from the rear of the occupant position, and at least one of the plurality of actuators is located to apply loads to the occupant from in front of the occupant position.

11. The motion simulator as claimed in claim 10, wherein the occupant position including a seat, a region of the cockpit forward of the seat comprises a housing configured to resemble a part of a vehicle and one or more of the plurality of actuators of the second drive mechanism are located within the housing.

12. The motion simulator as claimed in claim 11, wherein the vehicle is a motorcycle and the part of the vehicle is a fuel tank.

13. The motion simulator as claimed in claim 1, wherein the motion simulator is a motorcycle simulator, the motion simulator comprises a cockpit defining an occupant position including a seat, and the motion simulator comprises a pair of plates extending laterally below the level of the seat and configured to contact the knees of the occupant when seated on the seat.

14. The motion simulator as claimed in claim 13, comprising a third drive mechanism configured to drive the inclination of the plates relative to the seat to vary.

15. A motion simulator for imposing loads on an occupant, the simulator having:
a movable carrier configured to support the occupant;
a first drive mechanism configured to move the movable carrier;
multiple loading elements configured to attach to the occupant when the occupant is supported by the movable carrier;
a second drive mechanism configured to actuate the multiple loading elements to apply loads to the occupant; and
a controller, the controller being configured to implement a simulation of a motion event by controlling the second drive mechanism to cause the second drive mechanism to apply a differential load to the occupant;
wherein the second drive mechanism comprises a plurality of actuators configured to actuate the multiple loading elements, the actuators being located so as to apply loads to the occupant from locations that are non-coplanar.

16. The motion simulator as claimed in claim 2, wherein the second drive mechanism comprises a plurality of linear actuators each coupled to one or more of the multiple loading elements.

17. The motion simulator as claimed in claim 2, wherein the second drive mechanism comprises a plurality of rotary actuators each coupled to one or more of the multiple loading elements.

18. The motion simulator as claimed in claim 2, wherein the multiple loading elements are configured to attach to an article of clothing for applying loads to the occupant.

19. The motion simulator as claimed in claim 2, wherein the second drive mechanism is carried by the movable carrier.

20. The motion simulator as claimed in claim 2, wherein the second drive mechanism comprises a plurality of actuators configured to actuate the multiple loading elements, the plurality of actuators being located so as to apply loads to the occupant from locations that are non-coplanar.

* * * * *